United States Patent [19]

Sellstrom et al.

[11] Patent Number: 4,814,415

[45] Date of Patent: Mar. 21, 1989

[54] OXAMIDOAMINE CO-CURATIVES IN EPOXY THERMOSET ADHESIVES

[75] Inventors: Kathy B. Sellstrom, Pflugerville; David C. Alexander, Austin, both of Tex.

[73] Assignee: Texaco Chemical Company, White Plains, N.Y.

[21] Appl. No.: 157,758

[22] Filed: Feb. 19, 1988

[51] Int. Cl.[4] .............................. C08G 59/54
[52] U.S. Cl. .................... 528/111; 528/365; 528/407; 525/504
[58] Field of Search ........... 528/111, 407, 365; 525/504

[56] References Cited

U.S. PATENT DOCUMENTS

| | | | |
|---|---|---|---|
| 3,257,342 | 6/1966 | Kwong | 528/111 X |
| 4,070,225 | 1/1978 | Batdorf | 428/414 X |
| 4,082,708 | 4/1978 | Mehta | 528/111.3 |
| 4,115,360 | 9/1978 | Schulze et al. | 528/111 X |
| 4,119,615 | 10/1978 | Schulze | 528/343 |
| 4,133,803 | 1/1979 | Klein | 528/343 X |
| 4,146,700 | 3/1979 | Waddill et al. | 528/111 X |
| 4,147,857 | 4/1979 | Waddill et al. | 528/111 X |
| 4,169,177 | 9/1979 | Waddill et al. | 528/111 X |
| 4,179,418 | 12/1979 | Waddill | 528/111 X |
| 4,304,889 | 12/1981 | Waddill et al. | 528/111 X |
| 4,420,606 | 12/1983 | Waddill | 528/111 |
| 4,518,749 | 5/1985 | Waddill et al. | 528/111 X |
| 4,533,719 | 8/1985 | Waddill | 528/111 |

Primary Examiner—Earl Nielsen
Attorney, Agent, or Firm—Jack H. Park; Kenneth R. Priem; Richard A. Morgan

[57] ABSTRACT

The invention is an epoxy resin thermoset adhesive composition. The composition comprises the cured reaction product of:
(A) an epoxy base resin, and
(B) a curing amount of an admixture comprising:
 1. an oxamidoamine of the formula:

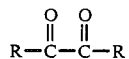

wherein: R is the polyoxypropylene moiety of the formula:

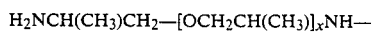

wherein: x ranges from 2 to 40, and
 2. an aliphatic polyetheramine, aliphatic polyamine, aromatic amine or mixture thereof.

The adhesives are cured at elevated temperature. They are noted for high peel strength and good shear strength.

9 Claims, No Drawings

OXAMIDOAMINE CO-CURATIVES IN EPOXY THERMOSET ADHESIVES

BACKGROUND OF THE INVENTION

1. Cross-Reference to Related Applications

This application is related to an application titled Amidoamine Co-curatives in Epoxy Thermoset Adhesives by K. B. Sellstrom and T. L. Renken, Ser. No. 157,757 filed on even date.

2. Field of the Invention

The invention relates to oxamidoamines as co-curatives with aliphatic polyetheramines, aliphatic polyamines, aromatic amines or mixtures thereof in epoxy resin thermoset adhesives.

DESCRIPTION OF OTHER RELEVANT MATERIALS IN THE FIELD

Epoxy resins constitute a broad class of polymeric materials having a wide range of physical properties. The resins are characterized by epoxide groups which are cured by reaction with curing agents selected to provide cured epoxy resin compositions with certain desirable properties.

U.S. Pat. No. 3,257,342 to J. N. S. Kwong teaches a thermoset epoxy resin composition comprising a polyglycidyl ether, an amino-terminated polyamide of (a) polymeric fatty acids and aliphatic dicarboxylic acid and (b) a polyoxyalkylenediamine. Particularly preferred are dimer fatty acids or mixed dimer and trimer acids. When aliphatic dicarboxylic acids wherein the carboxyl groups are separated by a chain of about 2 to 8 carbon atoms are incorporated, these short chain dicarboxylic acids are preferably pre-reacted with a polyoxyalkylene component.

U.S. Pat. No. 4,133,803 to H. P. Klein teaches a thermoplastic adhesive consisting essentially of the amide reaction product of a polyoxypropylene polyamine and an aliphatic or aromatic hydrocarbon dicarboxylic acid, ester or anhydride, e.g. oxalic acid. The polyamide reaction product is prepared by mixing and reacting the polyoxypropylene polyamine and carboxylic acid, ester or anhydride at a specified temperature. The adhesives are of the thermoplastic (hot-melt) type and comprise a small amount of the epoxy resin.

U.S. Pat. No. 4,119,615 to H. Schulze teaches resinous polyoxamide thermoplastic adhesives formed by reacting one mole of a polyoxypropylene polyamine with 1 to 4 moles of oxalic acid or a lower alkyl mono or diester of oxalic acid to form a liquid prepolymer. The prepolymer is reacted with 0.5 to 1.5 moles of a hydrocarbon diamine to form the resinous polyoxamide. The prepolymer is not amine functional. The reaction product is reacted with an amine to form the thermoplastic adhesive.

U.S. Pat. No. 4,518,749 to H. G. Waddill and H. Schulze teaches epoxy resin curatives comprising a polyepoxide and a curing amount of a bis(hydrogen maleate) derivative of a polyoxypropylenediamine.

U.S. Pat. No. 4,115,360 to H. Schulze and H. G. Waddill teaches epoxy resin adhesives comprising a vicinal polyepoxide, a curing amount of an amine curing agent and an effective amount of a polyether ureylene having terminal amino groups.

U.S. Pat. No. 4,169,177 to H. G. Waddill and H. Schulze teaches epoxy resin compositions comprising a vicinal polyepoxide, a curing amount of a substituted bicyclic anhydride and an effective amount of a diamide of a polyoxyalkylenepolyamine-urea condensate.

U.S. Pat. No. 4,304,889 to H. G. Waddill and H. Schulze teaches a solvent resistant epoxy resin composition comprising a vicinal polyepoxide, an aromatic polyamine and the condensation product of a low molecular weight polyoxyalkylenediamine with at least 2 moles of maleic anhydride. The inclusion of minor amounts of polyoxyalkylene amines improves properties of the resulting composition.

SUMMARY OF THE INVENTION

The invention is an epoxy resin adhesive composition. The thermoset adhesive composition comprises a base resin cured with an adhesion promoting curative admixture. The curative admixture comprises an oxamidoamine of the formula:

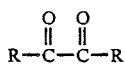

wherein: R is the polyoxypropylene moiety of the formula:

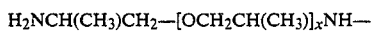

wherein: x ranges from 2 to 40. The co-curative of the admixture comprises an aliphatic polyetheramine, aliphatic polyamine, aromatic amine or mixture thereof.

DESCRIPTION OF THE PREFERRED EMBODIMENTS

The invention is an improvement in U.S. Pat. No. 3,257,342 to J. N. S. Kwong, incorporated herein by reference.

An improved epoxy formulation has been developed. The adhesive properties of a series of oxamidoamines is improved by incorporating as a co-curative aliphatic polyetheramines, aromatic amines or a mixture thereof. On curing, this admixture of curatives produces an adhesive composition with high peel strength as well as good shear strength.

The vicinal polyepoxides which are cured with the curative admixture of the invention are aromatic organic materials having an average of at least 1.8 reactive 1,2-epoxy groups per molecule. These polyepoxide materials can be monomeric or polymeric, monoaromatic or heterocyclic, and may be substituted if desired with other substituents besides the epoxy groups, e.g., hydroxyl groups, ether radicals, aromatic halogen atoms and the like. These vicinal polyepoxide containing compounds typically are of an epoxy equivalent weight (EEW) of 150 to 250. Preferably the base resin, which has an epoxide equivalent weight of from 175 to 195, is derived from condensing epichlorohydrin with 2,2-bis(p-hydroxyphenyl propane) to form 2,2-bis[(p-2,3 epoxy propoxy) phenyl]propane, a derivative of bisphenol A.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolac, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, with either a polyhydric phenol or a polyhydric alcohol. Typically the epoxy resins have an average of at least 1.8 reactive, 1,2-epoxy groups per molecule. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, 2,2-bis(4-hydroxycyclohexyl)propane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2', 3,3'-tetrahydroxydipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides which can be cured by the products of the invention in accordance with the present invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in H. Lee, and K. Neville, *Handbook of Eooxv Resins*, McGraw Hill Book Co., New York, 1967.

It will be appreciated by those skilled in the art that the vicinal polyepoxide compounds which are useful according to the practice of the present invention are not limited to those containing the above-described polyepoxides, but that these polyepoxides are to be considered merely as being representative of the class of vicinal polyepoxides as a whole.

The oxamidoamines are prepared according to the synthesis in Example 1, by reacting an oxalic acid ester such as diethyloxalate (DEO) with two molar quantities of a polyoxypropylenediamine of the formula:

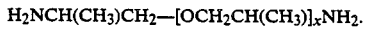

These diamines are commercially available in average molecular weights of 230 to 2000, with x averaging from about 2.6 to about 33.1.

The aliphatic polyetheramines which can be utilized as co-curatives in accordance with the instant invention are generally any of those amine curing agents which are well known to be useful for the curing of vicinal epoxides. Generally, those curing agents having at least three reactive amino hydrogens are useful.

Of the amine curing agents known to be effective in curing a vicinal epoxy resin, preferred curing agents in accordance with the instant invention are the polyoxyalkylene containing amine compounds. A preferred class of polyoxyalkylene polyamines is of the formula:

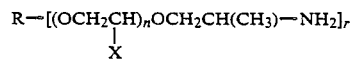

wherein X is hydrogen, methyl or ethyl radical; R is the nucleus of an oxyalkylation susceptible polyhydric alcohol containing 2 to 12 carbon atoms and 2 to 8 hydroxyl groups; n is a number ranging from 1 to about 15 and r is a number ranging from 2 to 4.

The most preferred polyoxyalkylenepolyamines are a polyoxypropylenediamine having a molecular weight of about 230 to 400 and a triamine of molecular weight about 400. These products are available under the tradename JEFFAMINE ®D-230, JEFFAMINE ®D-400 and JEFFAMINE ®T-403 from Texaco Chemical Co. Their use as curing agents is described in U.S. Pat. No. 4,189,564.

JEFFAMINE ®D-230 is represented by the formula:

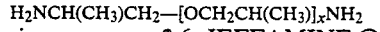

wherein x averages 2.6. JEFFAMINE ®D-400 is represented by the same formula wherein x averages 5.6.

JEFFAMINE ®T-403 is represented by the formula:

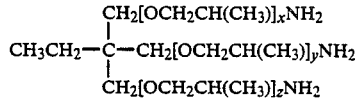

wherein x+y+z averages 5.3.

The aromatic amine co-curatives of the present invention include those compounds known to be useful in curing a vicinal polyepoxide.

These aromatic amines include the alkylene-linked polyphenylamines, phenylene diamines and polycyclic or fused aromatic primary amine compounds. Further, the corresponding cycloaliphatic amines, e.g., the above hydrogenated aromatic compounds can be utilized.

Preferred aromatic amine curing agents include the aromatic diamine obtained by replacing two nuclear hydrogen atoms of an aromatic hydrocarbon by —NH$_2$ groups said aromatic hydrocarbon having from 6 to 12 aromatic carbon atoms, inclusive, and is inclusive of phenylene, tolylene, naphthylene, and aromatic diamines having the formula:

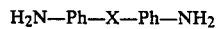

wherein Ph is a phenylene radical, X is selected from the group consisting of a single bond, —SO$_2$—, —(C=O)—, —O—. and lower alkylenes having from 1 to 4 carbon atoms; e.g. methylene, ethylene, propylene, butylene, and isomeric forms thereof, or lower alkyls having from 1 to 4 carbon atoms; e.g. methyl, ethyl, propyl, butyl, and isomeric forms thereof.

Prior to use the co-curative is admixed with the oxamidoamine. In general, small to moderate amounts of the co-curative are used for the lower molecular weight oxamidoamines. The more flexible higher molecular weight adducts require higher amounts of the co-curative.

It has been found that the only satisfactory method for determining the proper ratio of oxamidoamine and co-curative involves actually preparing a series of admixtures containing the materials being considered for use in a particular application in various concentrations and then reacting the admixture with a vicinal polyepoxide and curing the reaction product at, for example, 1 hour at 125° C. The examples demonstrate oxamidoamine:co-curative ratios of 1:1 to 60:1. The properties of cured castings and adhesion properties are then tested as described in Example 2 by standard ASTM methods. The sample with the desired properties for the specific application may then be chosen and an additional set of samples tested over a narrowed range containing the chosen sample in order to produce a custom formulation with desired properties. In particular, improvement in heat distortion temperatures and adhesion properties, especially peel strength, are noted with varying the oxamidoamine:co-curative ratio.

The curative agent is usually added to the formulation in such an amount that there is one reactive hydrogen atom in the curing component for each epoxy group in the epoxy resin component. These are known as stoichiometric quantities. The stoichiometric quantity can be calculated from the knowledge of the chemical structure and analytical data on the component. Stoichiometry unfortunately is not always calculable. For systems of the present invention, the proper amount of curative is the amount necessary to provide the best desired properties. This amount must be determined experimentally and can be accomplished by routine procedures known in the art. Generally the number of equivalents of reactive curative groups is from about 0.8 to 1.2 times the number of epoxide equivalents present in the curable epoxy resin composition, with from 0.9 to a stoichiometric amount being preferred. The exact amount of constituents in accordance with the above general requirements will depend, as mentioned, primarily on the application for which the cured resin is intended.

These epoxy systems may be cured rapidly with heat to provide a high degree of heat resistance along with a measure of flexibility. The curing temperature range acceptable in this invention is from about 60° C. to about 155° C. for up to 2 hours. Preferably curing is done at about 125.C. for about 1 hour.

Epoxy resins cured with oxamidoamines are generally rather rigid materials. As adhesives, epoxy systems cured with oxamidoamines usually have high peel strength but fairly low shear strength. Addition of strengthening additives normally causes some decrease in peel strength but improves shear strength dramatically. The instant oxamidoamines admixed with an aromatic amine and/or aliphatic polyetheramine and reacted with a vicinal polyepoxide resulted in epoxy adhesives with high peel strength as well as good shear strength, shown by way of Example.

EXAMPLE 1

Preparation of Oxamidoamines

The oxamidoamines were prepared by addition of one mole of diethyl oxalate to two moles of diamine. In a 2-liter, 3-necked round-bottomed flask, with a slow nitrogen flow, JEFFAMINE ®D-400 (860 g, 2.15 mol) was heated to 60° C. Diethyl oxalate (DEO) (157 g, 2.07 mol) was added dropwise over a 1.5 hour period. The resulting solution was heated at 125° to 130° C. under a distillation head, and during this period 80 ml distillate were collected. The residue was heated to 130° C. under a vacuum of 0.5 to 1.0 mm Hg, and an additional 20g distillate were obtained. The yellow residue designated (6183-29) weighed 913 g (99%) and contained 1.81 meq/g total amine, 1.79 meq/g primary amine, and 1.94 meq/g total acetylatable.

EXAMPLE 2

Cured Expoy Properties Obtained with Blended Curing Agents

| Formulation, pbw (6109) | -62D | -63B |
| --- | --- | --- |
| Liquid epoxy resin (EEW 188) | 100 | 100 |
| JEFFAMINE ® D-2000/DEO adduct | 30.3 | — |
| JEFFAMINE ® D-400/DEO adduct | — | 86.3 |
| JEFFAMINE ® D-400 | 30.3 | — |
| Epon ® Curing Agent Y | 10 | 10 |
| Properties Of Cured ⅛-inch Castings cured 2 hrs 80° C., 3 hrs 125° C. | | |
| Shore D hardness, 0-10 sec | 67-62 | 57-49 |
| Ultimate elongation, % | 37 | 125 |
| Heat deflection temp., °C. 264 psi/66 psi load | 48/50 | Room temp. |
| Izod impact strength, ft-lb/in | 0.39 | 1.18 |
| Tensile strength, psi | 4300 | 2700 |
| Tensile modulus, psi | 200000 | 50000 |
| Flexural strength, psi | 7500 | 1600 |
| Flexural modulus, psi | 226000 | 54000 |
| Compression strength, psi | 49000 | 55000 |
| Adhesion Properties cured 1 hr 125° C. | | |
| Tensile shear strength, psi (lap shear) | 2600 | 2200 |
| T-peel strength, pli | 16.9 | 38.3 |

EXAMPLE 3

Adhesive Properties Obtained after Curing with Blends of an Oxamidomamine and other Curing Agents

| A. Formulation, pbw (6301) | -16A | -16D | -16B | -16C |
| --- | --- | --- | --- | --- |
| Liquid epoxy resin (EEW 188) | 100 | 100 | 100 | 100 |
| JEFFAMINE ® D-400/DEO adduct | 146 | 115.9 | 86.3 | 56.4 |
| Epon ® Curing Agent Y | — | 5 | 10 | 15 |
| Adhesion Properties cured 1 hr 125° C. | | | | |
| Tensile shear strength, psi | 640 | 1100 | 2100 | 4300 |
| T-peel strength, pli | 10.0 | 19.0 | 27.1 | 15.0 |

| B. Formulation, pbw (6301) | -16A | -17A | -17B | -17C | -17D |
| --- | --- | --- | --- | --- | --- |
| Liquid epoxy resin (EEW 188) | 100 | 100 | 100 | 100 | 100 |
| JEFFAMINE ® D-400/DEO adduct | 146 | 119.2 | 92.6 | 66.0 | 39.5 |
| Diethylenetriamine | — | 2 | 4 | 6 | 8 |
| Adhesion Properties | | | | | |

| -continued | | | | | |
|---|---|---|---|---|---|
| cured 1 hr 125° C. | | | | | |
| Tensile shear strength, psi | 640 | 1400 | 2000 | 3100 | 4000 |
| T-peel strength, pli | 10.0 | 10.6 | 9.6 | 6.0 | 3.0 |

| C. Formulation, pbw (6301) | -16A | -18A | -18B | -18C | -18D |
|---|---|---|---|---|---|
| Liquid epoxy resin (EEW 188) | 100 | 100 | 100 | 100 | 100 |
| JEFFAMINE ® D-400/DEO adduct | 146 | 118.4 | 91.0 | 63.6 | 36.2 |
| JEFFAMINE ® D-400 | — | 10 | 20 | 30 | 40 |
| Adhesion Properties cured 1 hr 125° C. | | | | | |
| Tensile shear strength, psi | 640 | 770 | 960 | 1620 | 2290 |
| T-peel strength, pli | 10.0 | 9.9 | 12.7 | 14.8 | 15.4 |

| D. Formulation, pbw (6301) | -16A | -20A | -20B | -20C | -20D |
|---|---|---|---|---|---|
| Liquid epoxy resin (EEW 188) | 100 | 100 | 100 | 100 | 100 |
| JEFFAMINE ® D-400/DEO adduct | 146 | 133 | 114 | 82 | 50 |
| N—aminomethylpiperazine | — | 2 | 5 | 10 | 15 |
| Adhesion Properties cured 1 hr 125° C. | | | | | |
| Tensile shear strength, psi | 640 | 700 | 1100 | 2300 | 3700 |
| T-peel strength, pli | 10.0 | 15.9 | 14.3 | 19.8 | 6.0 |

The results of formulation 6301-16A showed that the oxamidoamine prepared from JEFFAMINE ®D-400 and diethyloxalate does not perform well when used as a sole curative. However, the oxamidoamine can be used in combination with co-curing agents to provide excellent adhesion properties in cured epoxy systems. As a co-curative with the oxamidoamine, JEFFAMINE ®D-400 (at 40 phr) offers moderate tensile shear strength and high peel strength. Diethylenetriamin and N-aminoethylpiperazine both offer improved tensile shear strength but lower the peel strength of the cured adhesives. Curing Agent Y offers both improved shear strength and improved peel strength to epoxy systems co-cured with the oxamidoamine.

EXAMPLE 4

Adhesion Properties of Epoxy Systems Cured with Oxamidoamine/Amine Blends

| A. Formulation, pbw | 6109 -62C | 6109 -62D | 6301 19A |
|---|---|---|---|
| Liquid epoxy resin (EEW 188) | 100 | 100 | 100 |
| JEFFAMINE ® D-2000/DEO adduct | 51 | 30.3 | 19.8 |
| JEFFAMINE ® D-400 | 51 | 30.3 | 19.8 |
| Epon ® Curing Agent Y | — | 10 | 15 |
| Adhesion Properties cured 1 hr 125° C. | | | |
| Tensile shear strength, psi | 1100 | 2600 | 3600 |
| T-peel strength, pli | 7.9 | 16.9 | 12.3 |

| B. Formulation, pbw | 6109 -62C | 6301 -19B | 6301 -19C | 6301 -19D |
|---|---|---|---|---|
| Liquid epoxy resin (EEW 188) | 100 | 100 | 100 | 100 |
| JEFFAMINE ® D-2000/DEO adduct | 51 | 41.8 | 32.4 | 23.1 |
| JEFFAMINE ® D-400 | 51 | 41.8 | 32.4 | 23.1 |
| Diethylenetriamine | — | 2 | 4 | 6 |
| Adhesion Properties cured 1 hr 125° C. | | | | |
| Tensile shear strength, psi | 1100 | 1900 | 2900 | 3400 |
| T-peel strength, pli | 7.9 | 10.8 | 7.6 | 7.2 |

| C. Formulation, pbw (6301) | 6109 -62C | 6301 -21A | 6301 -21B | 6301 -21C | 6301 -21D |
|---|---|---|---|---|---|
| Liquid epoxy resin (EEW 188) | 100 | 100 | 100 | 100 | 100 |
| JEFFAMINE ® D-400/DEO adduct | 51 | 46.6 | 39.9 | 28.7 | 17.6 |
| JEFFAMINE ® D-400 | 51 | 46.6 | 39.9 | 28.7 | 17.6 |
| N-aminoethylpiperazine | — | 2 | 5 | 10 | 15 |
| Adhesion Properties cured 1 hr 125° C. | | | | | |
| Tensile shear strength, psi | 1100 | 1100 | 2400 | 3100 | 3900 |
| T-peel strength, pli | 7.9 | 9.7 | 7.9 | 9.4 | 8.0 |

The oxamidoamine adduct of this example (JEFFAMINE ®D-2000/DEO) must be combined with a co-curing agent. Epoxy systems cured with the oxamidoamine alone were quite soft and had little strength. A 1/1 pbw blend of the oxamidoamine and JEFFAMINE ®D-400 was mixed with other curing agents for this example. All three of the other amines (Epon ® Curing Agent Y, diethylenetriamine, and N-aminoethylpiperazine) offered improved adhesion properties of epoxy systems co-cured with the JEFFAMINE ®D-400/oxamidoamine blend.

TABLE OF COMPOUNDS

JEFFAMINE ® D-230, D-400 and D-2000 are represented by the formula:

$$H_2NCH(CH_3)CH_2-[OCH_2CH(CH_3)]_xNH_2$$

wherein:

| JEFFAMINE ® | x(average) |
|---|---|
| D-2000 | 33.1 |
| D-400 | 5.6 |
| D-230 | 2.6 |

JEFFAMINE ® T-403 is represented by the formula:

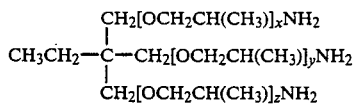

wherein x + y + z averages 5.3.

The use of these amines as epoxy resin curing agents is described in U.S. Pat. No. 4,189,564.

EEW-Equivalent Epoxy Weight
DEO-Diethyloxalate
Epon ® Curing Agent Y is described in U.S. Pat. No. 4,554,342 issued Nov. 19, 1983, to L. S. Corley (assigned to Shell Oil Co., Houston, Tex.) as a liquid aromatic amine having an amine nitrogen content of 14% to 16% by weight and a viscosity of 15 to 35 poise at 25° C., containing about 30% by weight o-toluenediamine and 70% by weight of an isomeric mixture of polymethylenepolyanilines.

| Table of Test Methods | |
|---|---|
| Shore D Hardness 0-10 seconds | ASTM D-2240 |
| Elongation at Break (%) | ASTM D-638 |
| Heat Deflection Temperature (HDT) (°C., 264 psi/66 psi) | ASTM D-648 |
| Izod Impact Strength (ft lb/in) | ASTM D-256 |
| Tensile Strength (psi) | ASTM D 638 |
| Tensile Modulus (psi) | ASTM D-638 |
| Flexural Strength (psi) | ASTM D-790 |
| Flexural Modulus (psi) | ASTM D-790 |
| T-peel Strength (pli) | ASTM D-1876 |
| Tensile Shear Strength (psi) | ASTM D-1002 |
| Compression Strength (psi) | ASTM D-695 |

While particular embodiments of the invention have been described, it is well understood that the invention is not limited thereto since modifications may be made. It is therefore contemplated to cover by the appended claims any such modifications as fall within in the spirit and scope of the claims.

What is claimed is:

1. An epoxy resin thermoset adhesive composition comprising the cured reaction product of:
(A) a vicinal polyepoxide having an average of at least 1.8 reactive, 1,2-epoxy groups per molecule,
(B) a curing amount of an admixture comprising
(1) an oxamidoamine of the formula:

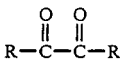

wherein: R is the polyoxypropylene moiety of the formula:

$$H_2NCH(CH_3)CH_2-[OCH_2CH(CH_3)]_xNH-$$

wherein: x ranges from 2 to 40.
(2) a co-curative comprising an aliphatic polyetheramine, aliphatic polyamine, aromatic amine or mixture thereof.

2. The adhesive composition of claim 1 wherein the aromatic amine is selected from the group consisting of m-phenylenediamine, 4,4'-methylenedianiline, 2,6-diaminopyridine, 4-chloro-o-phenylenediamine and mixtures thereof.

3. The adhesive composition of claim 1 wherein the co-curative is N-aminoethylpiperazine.

4. The adhesive composition of claim 1 wherein the aromatic amine is selected from the group represented by the formula:

$$H_2N-PH[-CH_2-PH]_x-NH_2$$

wherein Ph is a phenylene radical and x ranges from 1 to 3.

5. The adhesive composition of claim 1 wherein the co-curative is a mixture of toluenediamine and polymethylenepolyanilines.

6. The adhesive composition of claim 1 wherein the aliphatic polyetheramine is selected from the group represented by the formula:

$$H_2NCH(CH_3)CH_2-[OCH_2CH(CH_3)]_yNH_2$$

wherein y ranges from 2 to 40.

7. The adhesive composition of claim 1 wherein the aliphatic polyetheramine is selected from the group represented by the formula:

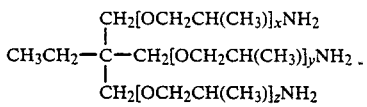

wherein x+y+z are numbers ranging from 1 to 15 and the sum of x, y and z ranges from 3 to 40.

8. The adhesive of claim 1 wherein the co-curative is diethylene triamine.

9. The adhesive of claim 1 wherein the aliphatic polyamine is diethylenetriamine.

* * * * *